US 6,676,016 B1

(12) United States Patent
Coskrey, IV

(10) Patent No.: US 6,676,016 B1
(45) Date of Patent: Jan. 13, 2004

(54) RETAIL TERMINAL CONFIGURED AS CONSUMER GATEWAY TO ELECTRONIC BILLING APPLICATION

(75) Inventor: Ernest C. Coskrey, IV, Lexington, SC (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/564,778

(22) Filed: May 4, 2000

(51) Int. Cl.[7] .................................................. G06K 5/00
(52) U.S. Cl. ...................... 235/380; 235/449; 235/375; 235/379; 235/382; 705/18
(58) Field of Search ................................ 235/380, 449, 235/375, 379, 382; 705/18

(56) References Cited

U.S. PATENT DOCUMENTS

| | | | | |
|---|---|---|---|---|
| 4,672,377 A | * | 6/1987 | Murphy et al. | 235/375 X |
| 6,032,859 A | * | 3/2000 | Muehlberger et al. | 235/449 |
| 6,182,894 B1 | * | 2/2001 | Hackett et al. | 235/380 |
| 6,212,504 B1 | * | 4/2001 | Hayosh | 235/375 X |
| 6,234,391 B1 | * | 5/2001 | Reichardt et al. | 235/441 |
| 6,243,689 B1 | * | 6/2001 | Norton | 705/18 |
| 6,522,772 B1 | * | 2/2003 | Morrison et al. | 235/383 |

FOREIGN PATENT DOCUMENTS

JP    40411095 A    *    4/1992

* cited by examiner

Primary Examiner—Thien M. Le
Assistant Examiner—Allyson Sanders
(74) Attorney, Agent, or Firm—Maginot, Moore & Bowman LLP

(57) ABSTRACT

A retail terminal is utilized as a gateway to an electronic billing application that allows a user to gain access to the electronic billing application and thereafter tender payment for the bill. A paper bill that is sent to a user is encoded with user login information that is obtainable by the retail terminal. The retail terminal obtains the user login information from the bill and logs the user into the electronic billing application. Various peripheral devices associated with the retail terminal are configured to accept payment for the bill. In one form, the user login information is encoded as a bar code on the bill that contains a user ID and, optionally, a password. The present invention improves the usability and reliability of an electronic billing application. Further, the present invention minimizes the chance that a user will erroneously enter someone else's account number, and provide a level of security by ensuring that the user is in possession of the printed bill. The electronic billing application is configured to be accessed from the retail terminal, read the user's login information from the bill, authenticate the information, and accept payment therefor.

20 Claims, 3 Drawing Sheets

RETAIL TERMINAL CONFIGURED AS CONSUMER GATEWAY TO ELECTRONIC BILLING APPLICATION

FIELD OF THE INVENTION

The present invention relates generally to retail terminals and, more particularly, to a retail terminal adapted to allow a user to gain access to an electronic billing application.

DESCRIPTION OF THE PRIOR ART

In the retail industry, a number of electronic retail terminals are used throughout a retail store. For example, the retail store may include a number of point-of-sale (POS) terminals such as traditional assisted (i.e. clerk-operated) checkout terminals. In addition to assisted point-of-sale terminals, the retail store may also include a number of unassisted point-of-sale terminals such as self-service checkout terminals. Self-service checkout terminals are retail terminals which are operated by a customer without the assistance of a retail clerk.

Moreover, in addition to point-of-sale terminals, the retail store may also include a number of information retail terminals such as kiosk-type devices. Such information retail terminals are generally located throughout the shopping area of the retail store and are provided to perform various information retail functions such as a product demonstration function (e.g. an audio/video advertisement), a customer data collection function (e.g. collecting and maintaining a customer profile database), and in some cases even a transaction function in which a customer may use the kiosk to tender payment for his or her items for purchase. Information retail terminals may be used to display product information to retail customers, or may be used as an interactive retail terminal which provides assistance to customers in response to a customer's input via a keypad or the like.

Most retail terminals, however, are limited in their operation to those functions listed above. Since such retail terminals are becoming more prevalent in places where a vast majority of the public has access to them, it would be beneficial to consumers if retail terminals had expanded capabilities.

What is needed is a retail terminal that allows a consumer to perform functions other than those performed by typical retail terminals.

What is further needed is a retail terminal that is adapted to allow a consumer to access a business application that is related to the retail business.

What is more specifically needed is a retail terminal that provides a consumer access to an electronic billing application.

What is even further specifically needed is a retail terminal that provides a consumer access to an electronic billing application for tendering payment for a bill.

What is still further specifically needed is a retail terminal that allows a consumer to gain secure access to an electronic billing application via a received bill for services relating to the retail business for tendering payment for that bill.

SUMMARY OF THE INVENTION

The present invention is a retail terminal that is configured to allow an end user of an electronic billing application to access the electronic billing application and tender payment for an outstanding bill.

A bill associated with the electronic billing application is printed with a bar code that is encoded with various information including a user's ID and optionally, a password. The bill is taken to a retail terminal that includes a bar code scanner. When the bill/bar code is scanned by the scanner the user is logged into the electronic billing application. Thereafter, the user can tender payment for the bill via a payment device associated with the retail terminal.

The electronic billing application is implemented on the retail terminal so as to include a login page that can receive a bar code scan event and take the strings that are read and use them to authenticate the user.

In one form, the present invention is a retail terminal that comprises, a processing unit, a display in electronic communication with the processing unit, a scanning device in electronic communication with the processing unit, a payment device in electronic communication with the processing unit, and memory in electronic communication with the processing unit. The memory has instructions stored therein which, when executed by the processing unit, causes the retail terminal to obtain user information from a bill via the scanning device, authenticate the user information, and accept payment for the bill via the payment device upon authentication of the user information.

In another form, the present invention is a method of accessing an electronic billing application via a retail terminal, wherein the retail terminal has a processing unit, a display in electronic communication with the processing unit, a scanning device in electronic communication with the processing unit, and a payment device in electronic communication with the processing unit. The method comprises the steps of obtaining user information from a bill via the scanning device, authenticating the user information, and accepting payment for the bill via the payment device upon authenticating the user information.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set forth herein illustrates a preferred embodiment of the invention, in one form, and such exemplification is not to be construed as limiting the scope of the invention in any manner.

DETAILED DESCRIPTION

Figure 1:
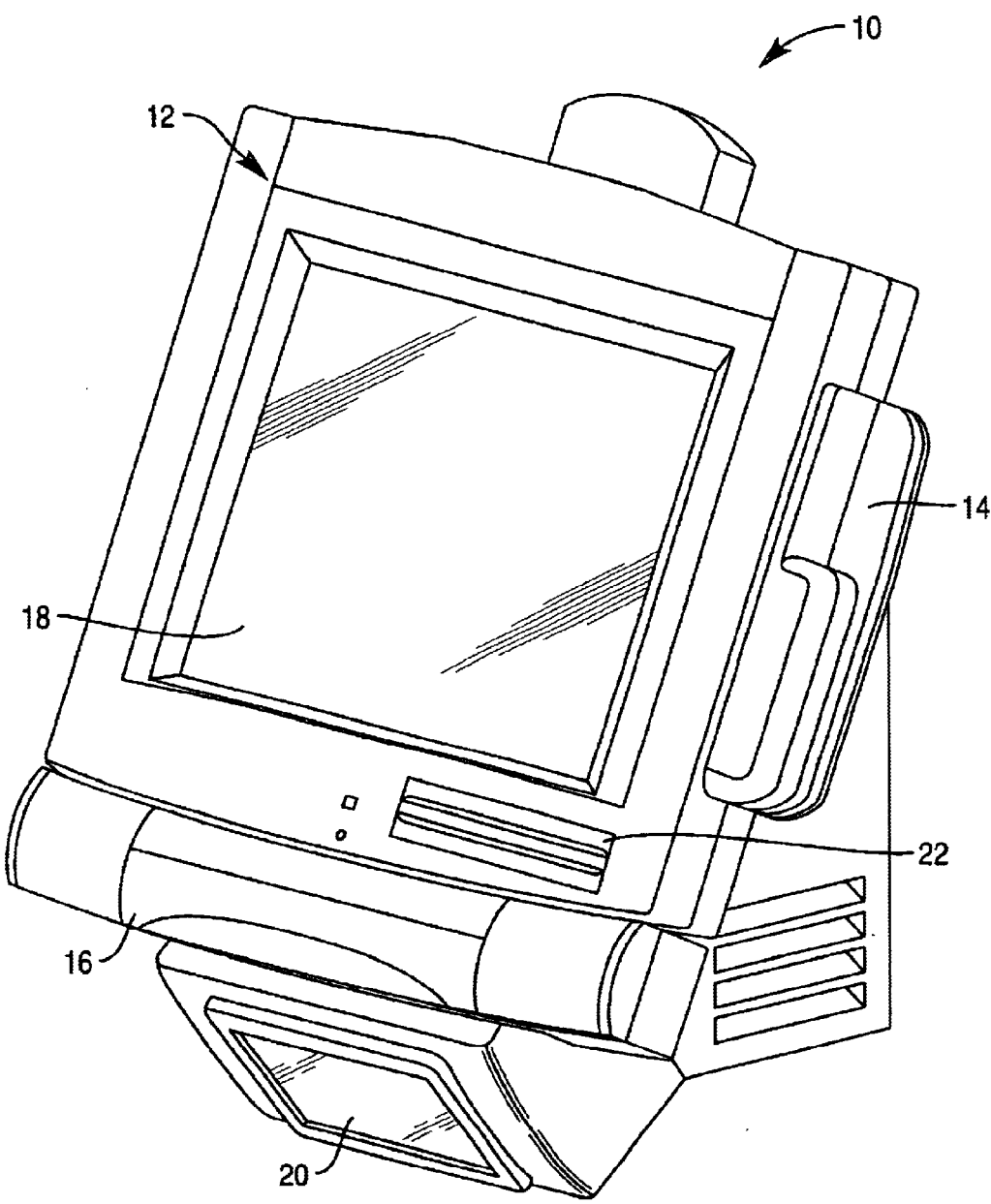
FIG. 1 is a front perspective view of a retail terminal adapted to carry out the present invention.

While the invention is susceptible to various modifications and alternative forms, specific embodiments thereof have been shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the appended claims.

With reference now to FIG. 1, there is shown a retail terminal generally designated 10. The retail terminal 10 may be what is known as a kiosk, or may be any type of similar terminal as is known in the art, and is depicted in FIG. 1 as a stand alone device. It should be appreciated that the retail terminal 10 may be mounted to a post or other structure, rest upon a table or similar surface, or be incorporated into any other type of construction. The retail terminal .10 is preferably of a consumer interactive type but not necessarily so. As such, the retail terminal 10 may be configured to perform a number of retail functions such as (i) a point-of-sale (POS) retail function, (ii) a product demonstration retail function, (iii) a data collection function, (iv) a passive display function, (v) an interactive, consumer query and answer function, and/or (vi) a bill payment/application access function or the like. Hereinafter, the retail terminal 10 may be interchangeably referred to as a kiosk but consistent with the above should be understood to include all types of retail terminals and consumer interactive terminals. The retail terminal 10 may be utilized to perform assisted and/or unassisted retail/interactive functions during an active or power-up mode as well as other function modes as described herein.

The retail terminal 10 includes a housing 12 that supports a display or monitor 18 for showing video or individual frames or screens depending on the particular mode of the retail terminal 10. The display 18 preferably incorporates a touch-screen 19 (see FIG. 2) as is known in the art that overlays the display 18 and allows user interaction in conjunction with material shown on the display 18. Commonly, such displays are of the LCD type but may be any style or type. The retail terminal 10 also includes a card reader 14 as is known in the art for obtaining information from a magnetic strip type card. The card reader 14 may be a smart card reader instead of or in addition to the magnetic strip type card reader. While not shown, the retail terminal 10 may include both types of card readers. The card reader 14 is adapted to obtain various identifying and/or account information from a user's card as in the known in the art. The retail terminal 10 is adapted to accept a PIN for a card inserted into the card reader 14 via a video generated keypad shown on the display 18 in conjunction with the touch-screen 19. Other methods of obtaining a PIN, such as a mechanical keyboard as is known in the art, but not shown, may be used instead of a video generated keypad. The card reader 14 may thus be considered a payment device.

Additionally, the retail terminal 10 includes a speaker assembly 16 that is preferably a stereo speaker assembly for playing music, audio messages and/or instructions and the like. Further, the retail terminal 10 includes a scanner 20 that is positioned to allow the scanning of a bar code or the like brought in proximity thereto. The scanner 20 may be any type of scanner or imager as is known in the art that is capable of capturing or imaging a bar code, graphics or the like. Such a scanner may be a laser type scanner, an LED type scanner, combination thereof, or the like as are well known in the art.

The retail terminal 10 also includes a cash acceptor device 22 that is adapted to receive paper money in various denominations, and thus constitute another type of payment device. While not shown, a cash acceptor device that is adapted to receive coins may also be provided. The coin cash acceptor may be in addition to the paper cash acceptor 22 in order for a user to tender an exact amount of dollars and cents. With the card reader(s) 14 and the cash acceptor(s) 22 (collectively "payment devices"), the retail terminal 10 is adapted and/or configured to receive/accept payment from a user.

It should be appreciated that the retail terminal 10 shown in FIG. 1 may have other components that are not specifically mentioned herein. These other components are generally known in the art. Additionally, the retail terminal 10 may be located anywhere either as a stand-alone self-contained unit, or as coupled to a network as a networked stand-alone terminal or workstation type unit. The principles of the present invention may likewise be incorporated into an existing retail unit/system.

Figure 2:
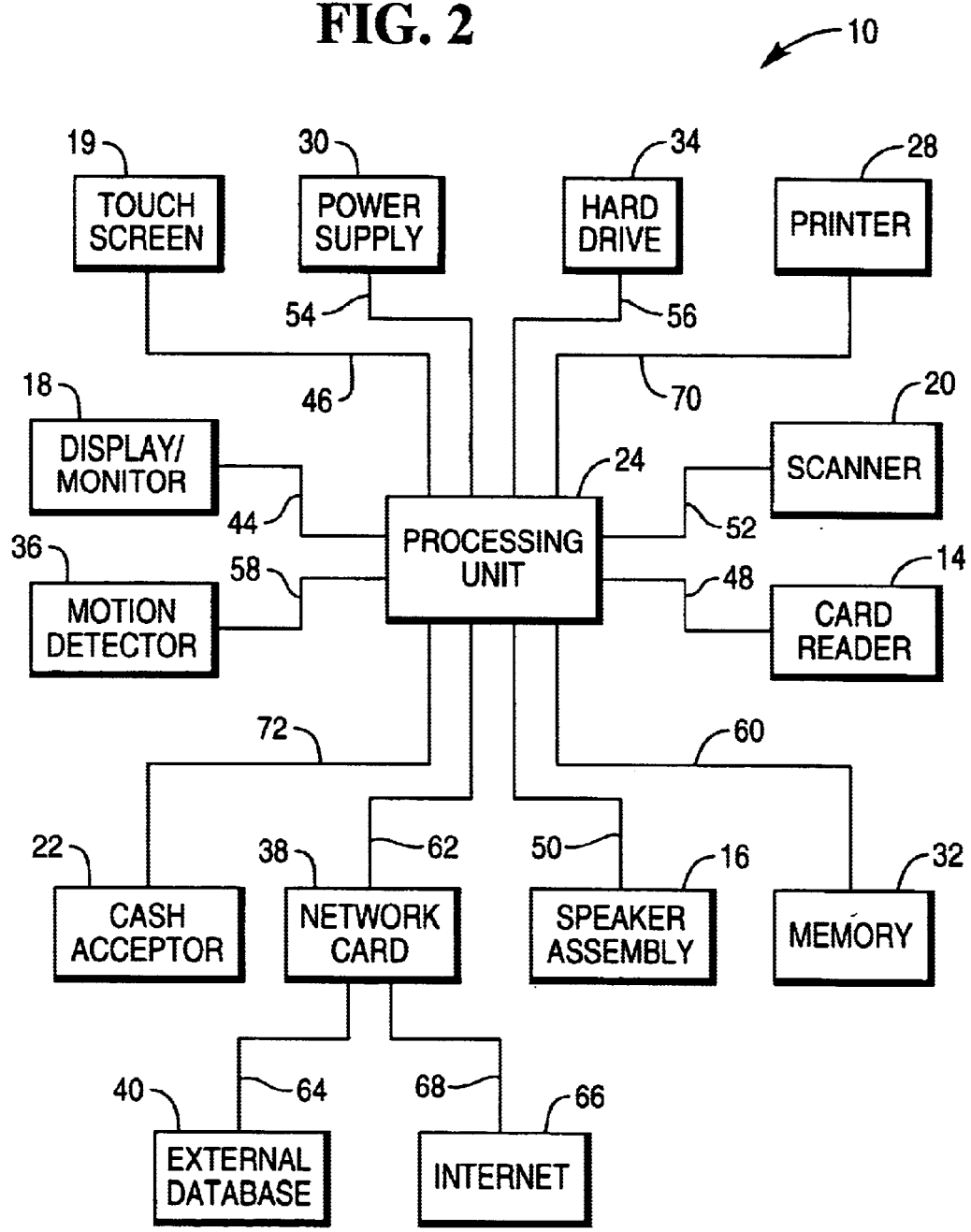
FIG. 2 is a block diagram of various components of the retail terminal of FIG. 1.

Referring now to FIG. 2, there is depicted a block diagram of the various components of the retail terminal 10 and their interconnection(s). It should be understood that some components may be internal to the housing 12 of the retail terminal 10 and thus not shown in FIG. 1.

The retail terminal 10 has a processing unit or circuitry 24 as is known in the art that includes a processor or microprocessor and associated circuitry as the main controller for or of the retail terminal 10. The processing unit 24 is in electronic communication with a typical power supply 30 via a power line 54. The power supply 30 is coupled to a source of electricity (not shown) and is transformed appropriately as is known in the art for use by the processing unit 24.

The card reader 14 is electronically coupled to the processing unit 24 via a communication line 48 that allows communication between the processing unit 24 and the card reader 14. Information from a user's card is thus obtained by the card reader 14 and used/processed by the processing unit 24. This may occur during ordering of a product and/or payment thereof, the retrieving of information, or for gaining access to an electronic billing application or the like. As well, the information from a user's card as retrieved or read by the card reader 14 allows the tendering of payment for an outstanding bill that has been previously sent to the user or other individual. In accordance with an aspect of the present invention, and as detailed below, a bill or invoice previously forwarded to a consumer may be paid via the retail terminal 10. One manner of payment may be through a debit card, a charge card, a smart card, or the like (collectively "card"). Information from the card is obtained via the card reader 14.

The display 18 is electronically coupled to the processing unit 24 via a communication line 44 that allows communication between the processing unit 24 and the display 18. The display 18 is used to show various icons, graphics, windows, video, screens and/or areas (i.e. PIN entry area, billing application screen, etc.), and through the touch-screen 19 has capabilities that allow for user/consumer interaction with the retail terminal 10. The touch-screen 19 overlays the display 18 and is in electronic communication with the processing unit 24 via communication line 46 to operate in conjunction with the display 18.

Additionally, the speaker assembly 16 is also electronically coupled to the processing unit 24 via a communication line 50 that allows audio information (stereo or mono) to pass to the speakers. The audio information may be music, discourse (i.e. messages, instructions, answers to queries, or the like), or a combination of music and discourse.

Further, the scanner 20 is as well electronically coupled to the processing unit 24 via a communication line 52 that allows communication between the processing unit 24 and the scanner 20. The scanner 20 is adapted to obtain a scan of a bar code and/or graphics on an object in proximity thereto. In order to accomplish a scan, the consumer moves the object (e.g. bill) thereunder such that the bar code on the object may be read by the scanner 20. The scanner 20 is typically always in an active mode during normal operation of the retail terminal such that the bar code of an object will be immediately scanned or read when the object is placed thereunder.

The retail terminal 10 may additionally include a motion detector 36 that is electronically coupled to the processing unit 24 via a communication line 58. The motion detector 36, in conjunction with the processing unit 24 and associated software, can be used to detect whether a customer is within a detection zone around the retail terminal 10 in order to allow the retail terminal 10 to perform an action or enter into a certain mode of operation.

As an example, the motion detector 36 and scanner 20 may work in tandem such that the scanner 20 is normally off when the motion detector 36 does not detect the presence of a consumer within the detection zone, but which activates the scanner 20 when a consumer is within the detection zone. After a predetermined time of inactivity, the scanner 20 may be deactivated until another triggering event has occurred (e.g. a consumer within the detection zone). As well, various types of motion of a consumer within the detection zone may trigger the scanner into activation.

The retail terminal 10 may include a hard drive 34 or other similar local or internal storage device that is in electronic communication with the processing unit 24 via communication line 56. The hard drive 34 may be used to store programs or the like, and any other information that allows the retail terminal 10 to function in accordance with the principles espoused herein. In accordance with one aspect of the present invention, the hard drive 34 may include modules or components of an electronic billing application that act in conjunction with remote modules or components, or the main program, of the electronic billing application.

As well, the processing unit 24 may be in communication with a memory device (or devices) 32 such as RAM or ROM via communication line 60 that may be used to temporarily or permanently store program/program instructions/ modules/components and other information as is necessary for operation of the retail terminal 10. The hard drive 34 also stores program information (programs/instructions) for the operation of the retail terminal and its components as described herein. Other program instructions required to carry out the various functions as described herein are also stored.

A network card 38, modem or the like (collectively network card) may be installed in the retail terminal 10. The network card is in electronic communication with the processing unit 24 via a communication line 62. The network card 38 allows the connection of the retail terminal 10 to an external database 40 via a dedicated line, telephone line 64 or the like as is known in the art. The external database 40 may be a data warehouse that contains account information as well as other various types of information. The network card 38 may also allow connection to the internet 66 via communication line 68. The external database 40 may be located at a main office and contain the main electronic billing application software/code in a network of retail terminals adapted to carry out electronic billing as disclosed herein that interfaces with the electronic billing application on each retail terminal. As well the internet 66 may allow connection to a main database of an electronic billing application.

The retail terminal 10 may be in electronic communication with a printer 28 via a communication line 70 for providing a printout or hard copy of information or data regarding a user's billing account.

In accordance with an aspect of the present invention, the retail terminal 10 is adapted to enter into a billing application mode. In one form, the retail terminal 10 is adapted to enter into a billing application mode upon the scanner 20 obtaining a scan of an appropriate bar code. Such an appropriate bar code is located on a bill for services/purchases that is printed and sent (e.g. mailed) to a consumer. Typically, the bill is for services/purchases from the particular business in which the retail terminal is located. This, however, is not necessary, as the retail terminal may be configured to allow access to several billing applications (e.g. one billing application per account/merchant) or one billing application that is tied to several accounts/merchants. As well, if the retail terminal is not located within any particular store, it may be configured to allow access to a plurality of billing applications.

The bar code on the bill is encoded to contain various information regarding the user (i.e. login information, user ID, password, etc.) as well as a code to have the retail terminal enter a billing application mode. When the user is logged into the particular billing application, various choices may be shown on the display 18 and selected via the touch-screen 19. Such choices may include viewing account history information and payment method. The payment method choice would preferably be keyed to the payment devices available on the particular retail terminal. The user would then be able to tender payment for the bill using one of the available payment devices associated with the retail terminal.

Figure 3:
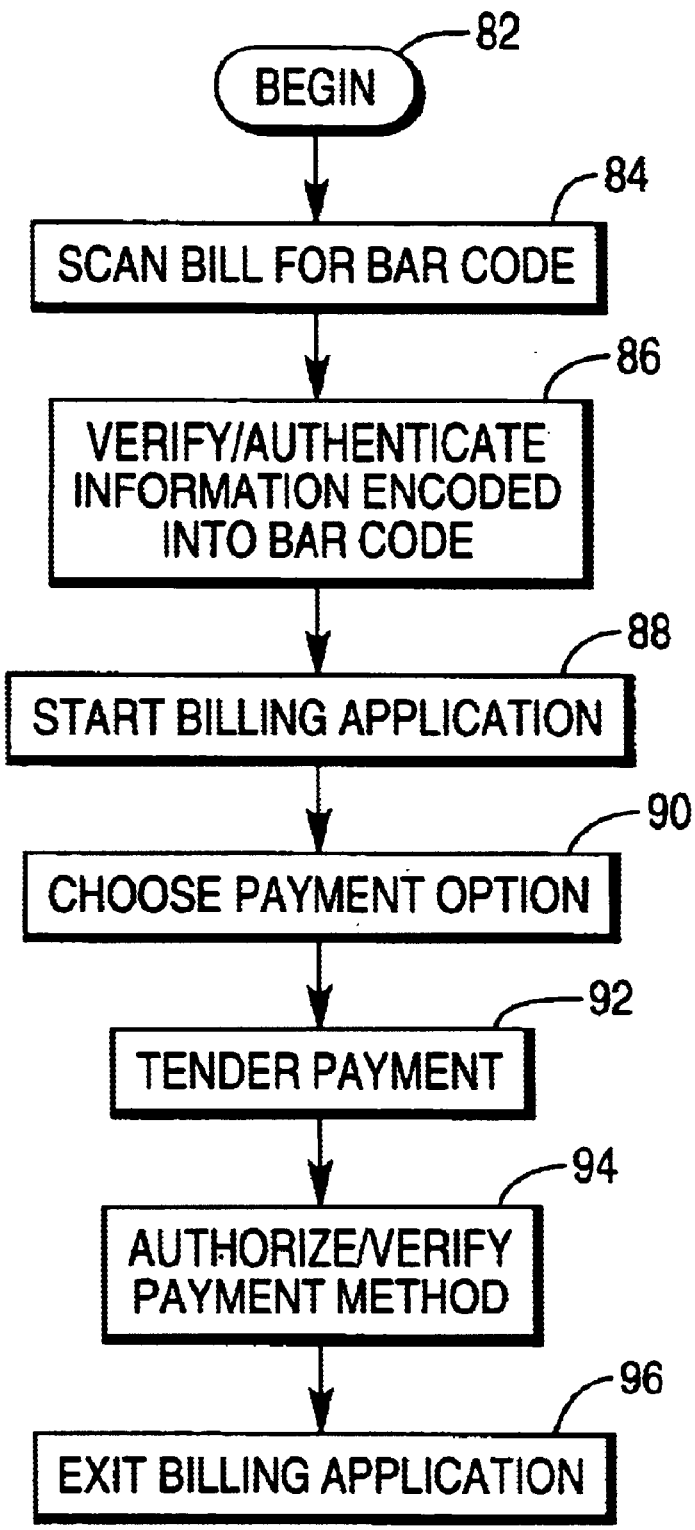
FIG. 3 is a program flowchart of the accessing of an electronic billing application and subsequent payment tendering for a bill in accordance with the present invention.

With reference to FIG. 3, there is shown a flowchart 80 depicting the bill payment method in accordance with the principles of the present invention. The process assumes that a bill has been forwarded to and received by a user. As well, the bill includes an encoded bar code per the principles detailed above. Once the retail terminal 10 is operable, the retail terminal 10 begins to wait for a scanning event, step 82. When a user places a bill with an appropriate bar code proximate the scanner 20, the scanner 20 scans the bill for the bar code, step 84. The information from the scanned bar code is verified/authenticated by the processing unit 24, step 86. Once the information is verified/authenticated, the retail terminal 10 enters or starts a billing application, step 88.

In step 90, the user chooses a payment option depending on the payment devices available or associated with the retail terminal, assuming the payment device is operable. Thereafter, in step 92, the user tenders payment. In the case of using a card, the card reader 14 is utilized. In the case of cash, the cash acceptor 22 is utilized. There may as well be a check acceptor (not shown) in which the amount of the check is keyed into the retail terminal 10 via a video keypad or the like. Other methods may as well be available.

Once the user has tendered payment, step 92, the retail terminal 10 authorizes/verifies the payment method 94. This may include the entering of a PIN or other information, and the electronic verification with the particular card holder of the user's credit line/availability, checking account funds availability, or the like. Thereafter, the retail terminal 10 exits the electronic billing application, step 96. Confirmation of the acceptance of payment (including partial payment in the case of a revolving credit account or the like) for the bill and/or crediting the account appropriately, may be evidenced by a printed receipt from the printer 28, by a digital receipt e-mailed to the user's e-mail account (either encoded into the bar code or on file), or any other means.

While this invention has been described as having a preferred design and/or configuration, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A retail terminal comprising:

a processing unit;

a display in electronic communication with said processing unit;

a scanner in electronic communication with said processing unit; and memory in electronic communication with said processing unit and having instructions stored therein which, when executed by said processing unit, causes the retail terminal to:
obtain user login information from a bill via said scanner;
verify the user login information; and
allow user access to an electronic billing application upon verification of the user login information,
wherein said retail terminal is also configured to perform a point-of-sale (POS) retail function.

2. The retail terminal of claim 1, comprising:

a payment device in electronic communication with said processing unit; and wherein said memory has further instructions stored therein which, when executed by said processing unit, causes the retail terminal to further accept payment for the bill via said payment device upon verification of the user login information.

3. The retail terminal of claim 2, wherein said payment device comprises a card reader.

4. The retail terminal of claim 3, wherein said card reader is one of a magnetic strip card reader and a smart card reader.

5. The retail terminal of claim 2, wherein said payment device comprises a cash acceptor.

6. The retail terminal of claim 1, wherein said scanner comprises a bar code scanner, and said user login information is encoded onto the bill as a bar code.

7. The retail terminal of claim 1, wherein the scanner is operable to scan information from an item for purchase into said retail terminal.

8. In a retail terminal having a processing unit, a display in electronic communication with the processing unit, a scanning device in electronic communication with the processing unit, and a payment device in electronic communication with the processing unit, a method comprising the steps of:

obtaining user information from a bill via the scanning device of the retail terminal;

authenticating the user information;

accepting payment for the bill via the payment device of the retail terminal upon authenticating the user information; and performing a point-of-sale (POS) retail function with the retail terminal.

9. The method of claim 8, wherein the step of obtaining user information from a bill via a scanning device includes utilizing a bar code scanner.

10. The method of claim 8, wherein the step of accepting payment for the bill via the payment device includes utilizing a card reader.

11. The method of claim 10, wherein the utilization of a card reader includes utilization of one of a magnetic strip card reader and a smart card reader.

12. The method of claim 8, wherein the step of accepting payment for the bill via the payment device includes utilizing a cash acceptor.

13. The method of claim 8, wherein the step of performing a point-of-sale (POS) retail function includes obtaining information from an item for purchase via the scanning device.

14. In a retail terminal having a processing unit, a display in electronic communication with the processing unit, and a scanner in electronic communication with the processing unit, a method comprising the steps of:

obtaining user login information from a bill via the scanner of the retail terminal;

verifying the user login information;

allowing user access to an electronic billing application upon verification of the user login information; and performing a point-of-sale (POS) retail function with the retail terminal.

15. The method of claim 14, wherein the retail terminal further includes a payment device, and the method further includes the step of:

accepting payment for the bill via the payment device upon verification of the user login information.

16. The method of claim 15, wherein the step of accepting payment for the bill via the payment device upon verification of the user login information includes utilizing a card reader.

17. The method of claim 16, wherein the utilization of a card reader includes utilizing one of a magnetic strip card reader and a smart card reader.

18. The method of claim 15, wherein the step of accepting payment for the bill via the payment device upon verification of the user login information includes utilizing a cash acceptor.

19. The method of claim 14, wherein the step of obtaining user login information from a bill via the scanner includes utilizing a bar code scanner, and the user login information is encoded onto the bill as a bar code.

20. The method of claim 14, wherein the step of performing a pointof-sale (POS) retail function includes obtaining information from an item for purchase via the scanner.

* * * * *